No. 836,983. PATENTED NOV. 27, 1906.
F. MILLWEE.
COOKING UTENSIL.
APPLICATION FILED OCT. 10, 1905.

UNITED STATES PATENT OFFICE.

FRANK MILLWEE, OF MARLOW, INDIAN TERRITORY.

COOKING UTENSIL.

No. 836,983.

Specification of Letters Patent.

Patented Nov. 27, 1906.

Application filed October 10, 1905. Serial No. 282,204.

*To all whom it may concern:*

Be it known that I, FRANK MILLWEE, a citizen of the United States, residing at Marlow, in the county of Pickens, Indian Territory, have invented new and useful Improvements in Cooking Utensils, of which the following is a specification.

This invention relates to cooking utensils, and especially to meat-broilers, and has for its objects to produce a comparatively simple inexpensive device of this character which in practice will efficiently perform its functions, one whereby the liquids drawn from the meat during the cooking operation will flow to a point remote from the meat, and one from which the liquid may freely escape.

With these and other objects in view the invention comprises the novel features of construction and combination of parts more fully hereinafter described.

Figure 1:
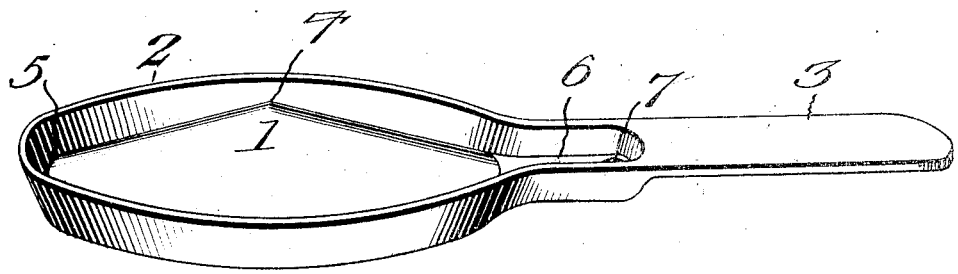
Figure 2:
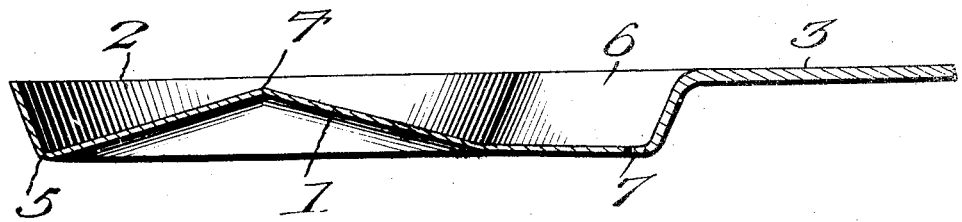

In the accompanying drawings, Figure 1 is a perspective view of a broiler embodying the invention. Fig. 2 is a vertical section taken on a line centrally and longitudinally of the handle.

Referring to the drawings, it will be seen that the utensil comprises a bottom 1, a marginal upstanding wall or rim 2, and a handle 3, these parts being case or otherwise formed in a single piece.

The bottom 1 of the utensil is of conical form, as shown, and arranged to project upwardly within the marginal rim 2 to present a central point or apex 4 of maximum height, from which point the bottom slopes gradually downward to its point of juncture with the rim 2, thereby forming a marginal trough or gutter 5, leading to a compartment or chamber 6, formed, preferably, at the inner end of the utensil, into which it opens at its inner end, there being formed through the bottom of the utensil and at the outer end of the chamber 6 a discharge opening or port 7.

In practice the meat to be broiled is placed in the utensil, as usual, and the latter arranged over a fire. As the cooking operation progresses the liquid drawn from the meat flows down the inclined face of the bottom 1 into the marginal channel or gutter 5, and thence to the compartment 6, from which it escapes through the port 7, whereby a dry condition of the meat is preserved and the broiling action facilitated, it being understood that during the broiling operation the utensil is tilted from time to time to cause the juices accumulated in the channel 5 to flow into the compartment 6.

From the foregoing it is apparent that I produce a simple inexpensive device admirably adapted for the attainment of the ends in view, it being understood that minor changes in the details herein set forth may be resorted to without departing from the spirit of the invention.

Having thus fully described my invention, what I claim as new is—

1. As a new article of manufacture, a culinary vessel having a handle and comprising a bottom and a marginal wall, said vessel being provided with a drip-chamber having a discharge-port leading through its bottom, the bottom of the vessel being of concavo-convex form with its convex face disposed uppermost.

2. As a new article of manufacture, a culinary vessel having a concavo-convex bottom disposed with its convex face uppermost and bounded by a marginal wall, the vessel being provided with a drip-chamber arranged to communicate therewith and having a drip-opening leading through its bottom.

3. As a new article of manufacture, a culinary vessel having a handle and comprising a bottom bounded by a marginal wall, said bottom being of concavo-convex form with its convex face disposed uppermost on the vessel having a drip-chamber communicating therewith, said chamber having a drip-opening leading through its bottom.

In testimony whereof I affix my signature in presence of two witnesses.

FRANK MILLWEE.

Witnesses:
 T. P. MARTIN, Jr.,
 S. A. ANTHONY.